United States Patent [19]

Beggins

[11] 4,414,712
[45] Nov. 15, 1983

[54] LINE FASTENING DEVICE

[76] Inventor: Paul T. Beggins, The Keel, East Islip, N.Y. 11730

[21] Appl. No.: 347,670

[22] Filed: Feb. 10, 1982

[51] Int. Cl.³ .......................... F16G 11/00; B63B 21/00
[52] U.S. Cl. ..................................... 24/129 R; 24/128; 114/218; 114/230
[58] Field of Search ................... 24/128, 129 A, 129 B, 24/129 D, 129 W, 130, 129 R; 114/218, 230, 221 R, 119

[56] References Cited

U.S. PATENT DOCUMENTS

| | | | |
|---|---|---|---|
| 630,837 | 8/1899 | Anderson et al. | 24/129 R |
| 947,111 | 1/1910 | Lorentz | 24/129 R |
| 1,718,641 | 6/1929 | Forman | 24/129 R |
| 1,862,478 | 6/1932 | Gascoin | 24/129 R |
| 2,203,433 | 6/1940 | Gundian | 114/230 |
| 2,592,696 | 4/1952 | Hoody | 24/128 R |
| 2,870,506 | 1/1959 | Hudkins et al. | 24/129 R |
| 3,094,755 | 6/1963 | Casanave | 24/129 R |
| 3,599,592 | 8/1971 | Welton | 114/230 |
| 3,857,645 | 12/1974 | Klein | 24/129 R |
| 3,878,808 | 4/1975 | Mock, Jr. | 114/230 |
| 3,918,385 | 11/1975 | Wallace | 114/230 |
| 4,034,443 | 7/1977 | Turner | 24/129 R |
| 4,105,349 | 8/1978 | Kupperman et al. | 24/129 R |
| 4,109,603 | 8/1978 | Guthmann | 114/230 |
| 4,114,553 | 8/1978 | Zidek | 24/128 |
| 4,261,280 | 4/1981 | Collic, Sr. | 114/230 |

FOREIGN PATENT DOCUMENTS

| | | | |
|---|---|---|---|
| 1214658 | 12/1970 | United Kingdom | 24/129 R |
| 2051218 | 1/1981 | United Kingdom | 24/129 B |

Primary Examiner—Gene Mancene
Assistant Examiner—David I. Tarnoff
Attorney, Agent, or Firm—James Creighton Wray

[57] ABSTRACT

A device that can form and hold an eye in a line without the use of a knot that has an elongated body with passageways extending between its longitudinal ends. Lateral openings and access holes allow the line to escape the passageways between both ends. The line passes into a passageway of the elongated body at a first longitudinal end, passes out of the passageway through a lateral opening, passes back into the passageway through an adjacent lateral opening and passes out of the passageway through a second longitudinal end. After forming an eye, the line re-enters the elongated body at the second end and passes through another passageway exiting through an opening at the first end. A section of line departs from the passageway through another lateral opening. The line is further secured to the elongated body by first forming a loop and then passing the line between the elongated body and the departing section of line. The line is passed over the body and then passed between the body and the loop. Once the eye is formed, the line can be manipulated around objects beyond the physical reach of the user's arm by attaching one end of a boat hook to the elongated body.

16 Claims, 10 Drawing Figures

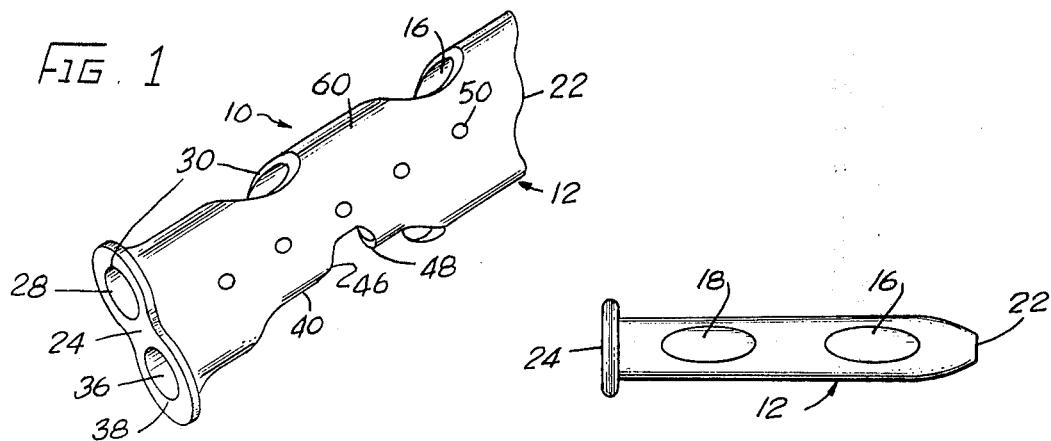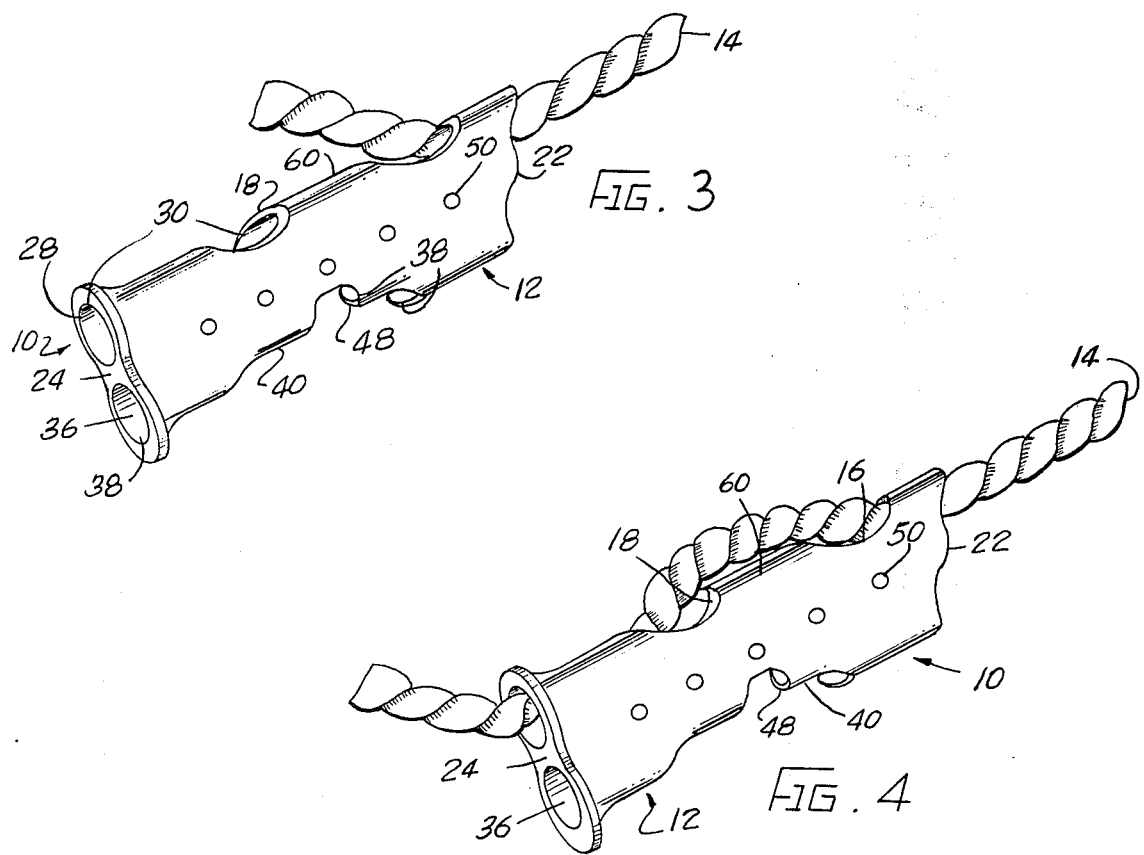

LINE FASTENING DEVICE

BACKGROUND OF THE INVENTION

This invention relates generally to line holding devices. More particularly, this invention relates to devices for forming an eye in a line and for fastening a line around objects without the use of a knot.

Pertinent United States and foreign patents are found in Class 24, subclasses 129R, 129B and 128R, and in Class 114, subclasses 230 and 218 of the Official Classifications of Patents in the U.S. Patent and Trademark Office.

Examples of pertinent patents are U.S. Pat. Nos. 4,270,492; 4,261,280; 4,109,603; 4,105,349; 4,034,443; 3,599,592; 3,321,816 and 3,094,755.

U.S. Pat. Nos. 4,109,603; 3,321,816; 4,270,492 and 3,094,755 show connector devices which hold line around an object while allowing the line to slide through the device for adjusting the line around the object.

U.S. Pat. Nos. 4,034,443 and 4,105,349 show flat, triangular devices with apertures in the apex positions for passing line through to form a sliding noose.

U.S. Pat. No. 3,599,592 shows a device for releasing a noose in a line when a loop is thrown in the rope to release a lever in the device. U.S. Pat. No. 4,261,280 shows a clamp and hook arrangement for attaching boat line to a piling using a boat hook.

Line holding devices of the type described above loosely hold a noose or eye in the line while allowing the noose to be shortened by putting tension on the line.

Line holding devices of the type described above, while allowing an eye to be formed in a line, do not offer the utility or safety of easily fastening or releasing a line from around an object.

SUMMARY OF THE INVENTION

The present invention overcomes many of the problems which exist in the prior art devices.

The present invention has passageways in an elongated body for receiving the line. Lateral openings into the passageways allow the line to escape from and return to the passageways between the longitudinal ends. When the line is fed through the passageways and the openings and between the line and the elongated body, it causes the line to tighten on itself and the body. After the line is secured around an object and the eye is pulled taut, the line will be tightened about the elongated body and will not allow the line to slip through the body or the eye to lengthen. The eye will be tightly held around the fastened object.

Objects of the invention are to provide an improved line holding device and to provide an improved device for holding an eye in a line.

Another object of the invention is to provide a device for tightly holding a line around a fastened object.

Another object of the invention is to provide the ability of holding an eye in a line without use of a knot.

Another object of the invention is to provide the ability of tightly holding a line around an object without use of a knot.

Another object of the invention is to provide the ability of easily forming an eye in a line around an object which we could not secure a fixed eye to.

Another object of the invention is to provide the ability of easily releasing an eye in a line from an object we could not release a fixed eye from.

Another object of the invention is to provide the ability of forming any size eye in a line without the use of a knot.

Another object of the invention is to provide the ability of attaching a line to any object without the use of a knot.

Another object of the invention is to eliminate the need for purchasing a line with an eye already spliced in it.

Another object of the invention is to eliminate the need for splicing an eye in a line.

Another object of the invention is to provide an inexpensive and easily manufactured device for forming and holding an eye in a line.

Another object of the invention is to provide the ability to fasten an eye in a line around an object beyond the physical reach of the user's arm.

Another object of the invention is to provide the ability to remove a line from around an object beyond the physical reach of the user's arm.

A line fastening device for forming an eye in a line has an elongated body with first and second longitudinal ends and at least one passageway extending through the body and openings at the ends for passing line therethrough. The elongated body has a first lateral opening extending into the passageway allowing line within the passageway to depart the passageway.

Preferably, the elongated body has two adjacent second and third lateral openings in the body extending into the passageway, located on a lateral side opposite the first lateral opening, for passing a line out of the passageway through the second lateral opening and back into the passageway through the third lateral opening.

In the preferred embodiment, the elongated body has a first access hole into the passageway perpendicular to the first opening and communicating with the first opening. In the preferred embodiment, the elongated body further has a second access hole into the passageway, opposite the first hole perpendicular to the first opening and communicating with the first opening.

A line fastening device for forming an eye in a line has first and second parallel passageways and openings at the ends for passing line through each passageway. A lateral opening extends into the first passageway for access to the line within the first passageway.

Preferably, the elongated body has two more adjacent lateral openings in the body extending into the second passageway, located on lateral side opposite the first lateral opening, for passing a line out of the second passageway through one of the adjacent lateral openings and returning the line back into the second passageway through the other adjacent lateral opening.

A line passes into the passageway at a first longitudinal end, out of the elongated body through a lateral opening, passing back into the passageway of the elongated body through an adjacent lateral opening, out of the passageway through another longitudinal end, forming an eye, the line passing back into the passageway through the second longitudinal end and passing out of the passageway through the first end. The line forms a loop and passes between the elongated body and a section of the line departing from the elongated body through an opening, passes around the elongated body and passes between the elongated body and the loop.

A line passes into the passageway at one end, passing out of the passageway at another end, forming an eye, passing back into the passageway and passing out of the passageway at the first longitudinal end allowing a section of line to depart from a lateral opening. The line forms a loop before passing between the elongated body and the section of line departing from the elongated body at a lateral opening, passing over the elongated body and between the elongated body and the loop.

In the preferred embodiment, the device has extension means for manipulating the elongated body across distances.

Preferably, the device has a series of attachment holes through the elongated body of the device not interfering with the passageways, to which an attachment means may be fastened which will allow the device to be securely attached to the end of a boat pole.

Preferably, the elongated body has an attachment hole through it not interfering with the passageways and has extension means with a string passing through the attachment hole along the line away from the elongated body for remote manipulation.

Preferably, a ring may be fastened to the attachment hole in the device farthest away from the eye in the line which will allow the device to be drawn towards oneself with the hook on a boat pole.

These and other and further objects and features of the invention are apparent in the disclosure which includes the above and below specification and claims.

BRIEF DESCRIPTION OF THE DRAWINGS

FIG. 1 is a perspective view of the body of a line fastening device embodying the features of the present invention.

FIG. 2 is a top plan view of the body of the line fastening device shown in FIG. 1.

FIG. 3 is a perspective view of the body of the line fastening device shown in FIG. 1, further including a line fed into the body.

FIG. 4 is a perspective view of the line fastening device shown in FIG. 3, with line fed further through the body.

DETAILED DESCRIPTION OF THE PREFERRED EMBODIMENT OF THE INVENTION

Figure 5:
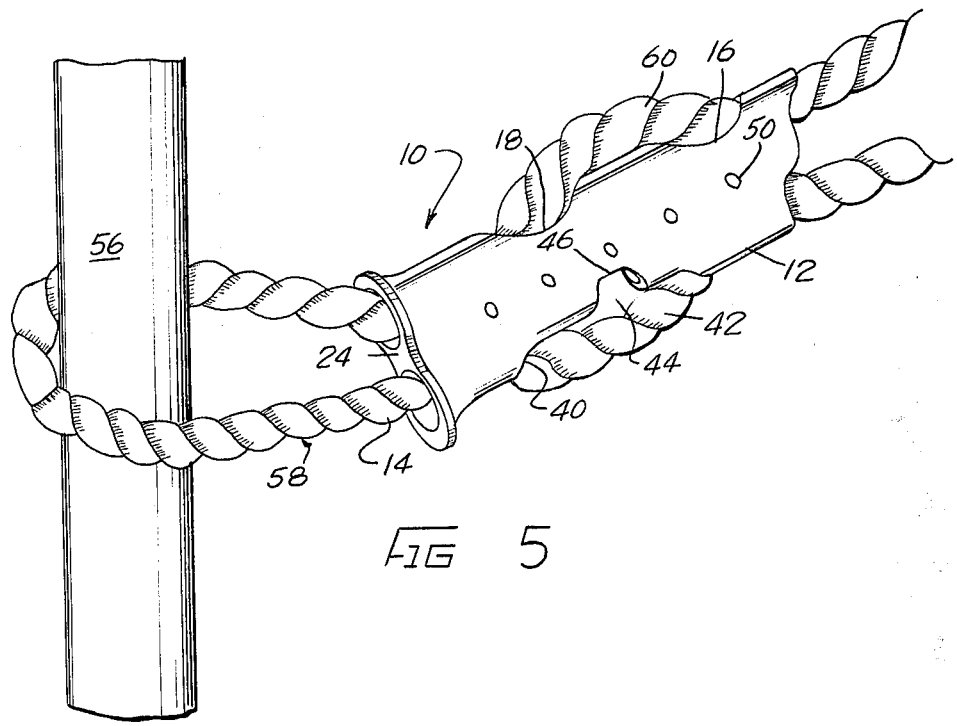
FIG. 5 is a perspective view of the line fastening device shown in FIG. 4, with eye in line around a post and the line further fed back through the body of the line fastening device.
Figure 6:
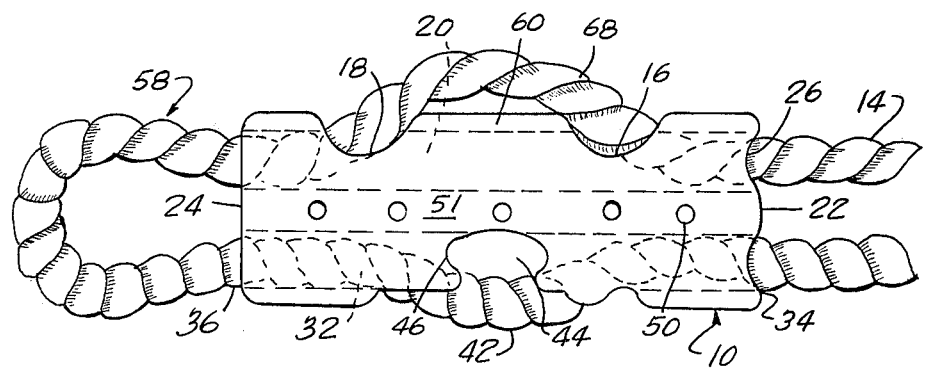
FIG. 6 is a side plan view of the line fastening device with line passing through the device as in FIG. 5, showing the internal passageways and line passing therethrough.
Figure 7:
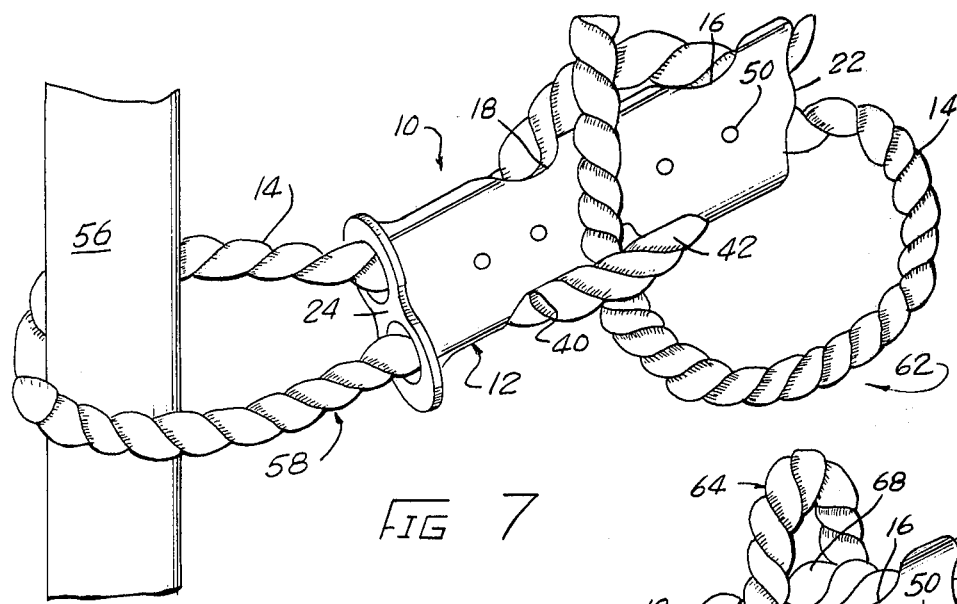
FIG. 7 is a perspective view of the line fastening device of FIG. 5, with line further fed about the device.
Figure 8:
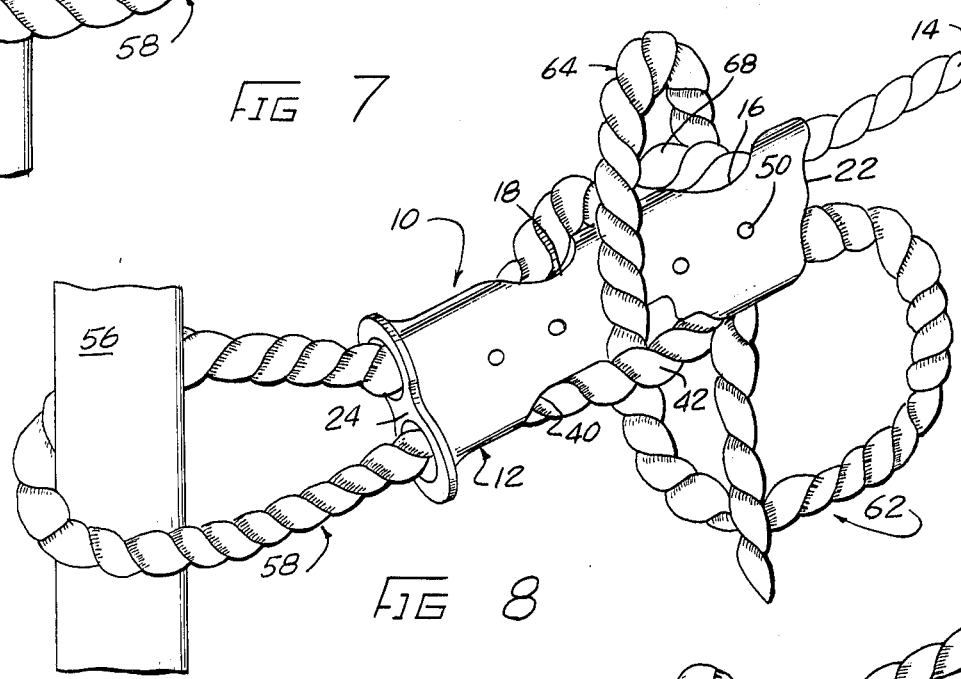
FIG. 8 is a perspective view of the line fastening device of FIG. 7 with line further fed about the device.
Figure 9:
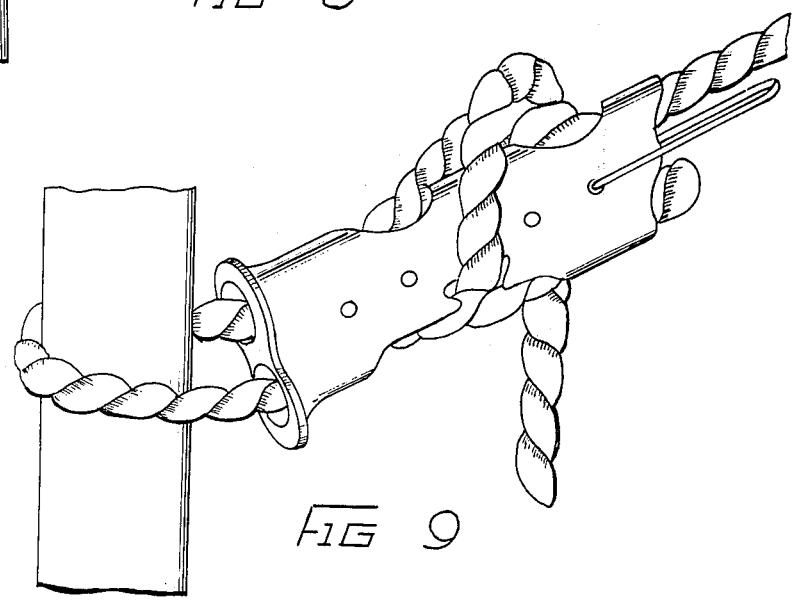
FIG. 9 shows the line pulled tight around the fastening device.
Figure 10:
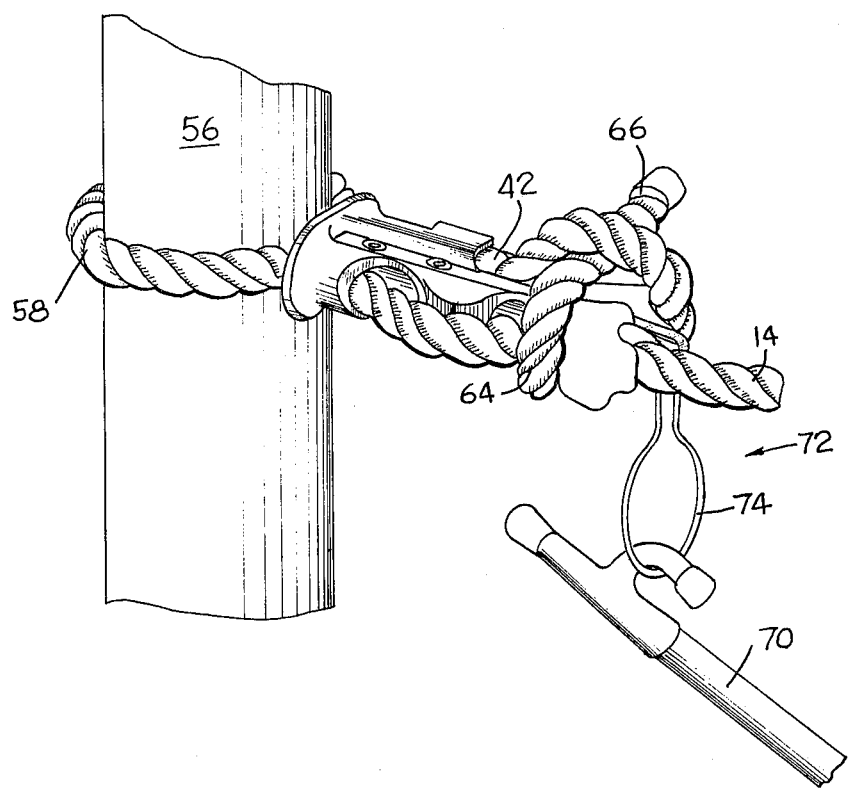
FIG. 10 is a perspective view of the line fastening device with a boat pole engaging a ring attachment device.

Referring to FIGS. 1 through 8, the line fastening device is generally indicated by the numeral 10.

The line fastening device 10 has elongated body 12 and includes line 14. Elongated body 12 has lateral openings 16 and 18 into passageway 20. The lateral openings 16 and 18 have sufficient size to allow line 14 to pass out of passageway 20 through opening 16 and back into passageway 20 through opening 18. Passageway 20 extends from longitudinal end 22 to opposite longitudinal end 24. Line 14 can be introduced into passageway 20 through opening 26 at end 22 or through opening 28 at end 24. Line 14 may also exit from passageway 20 through openings 26 or 28. Passageway 20 has circular shaped cross-section in the preferred embodiment. Alternatively, passageway 20 may have eliptical, oblong, square, triangular, rectangular or any other regularly or irregularly shaped cross-section. In the preferred embodiment, passageway 20 has cross-sectional diameter slightly larger than cross-sectional diameter of line 14 to allow line 14 to pass through passageway 20 impeded only by frictional forces of passageway wall 30. It is understood that the invention is not limited to this embodiment and further contemplates passageway 20 having cross-sectional diameter ranging from similar to the cross-sectional diameter of line 14 to very many times the cross-sectional diameter of line 14.

Elongated body 12 also has passageway 32 extending parallel to passageway 20 from longitudinal end 22 to longitudinal end 24. It is understood that the invention is not limited to this orientation and number of passageways, but includes only one passageway, or more than two passageways for receiving line 14. Elongated body 12 has opening 34 at flared longitudinal end 22 and opening 36 at longitudinal end 24 to allow entrance of line 14 into passageway 32. Line 14 may also exit passageway 32 through openings 34 and 36. Passageway 32 has circular shaped cross-section in the preferred embodiment. Alternatively, passageway 32 may have eliptical, oblong, square, triangular, rectangular or any other regularly or irregularly shaped cross-section. In the preferred embodiment, passageway 32 has cross-sectional diameter slightly larger than the cross-sectional diameter of line 14 to allow line 14 to pass through passageway 32 impeded only by frictional forces of passageway wall 38. It is understood that the invention is not limited to this embodiment and further contemplates passageway 32 having cross-sectional diameter ranging from similar to the cross-sectional diamter of line 14 to very many times the cross-sectional diameter of line 14.

Elongated body 12 has lateral opening 40 leading into passageway 32. Lateral opening 40 has sufficient size to allow line section 42 of line 14 to depart passageway 32 and define space 44 between line section 42 and elongated body 12. Elongated body 12 also has access holes 46 and 48 perpendicular to lateral opening 40 into passageway 32. Access holes 46 and 48 communicate with lateral opening 40 to provide access to line section 42 in passageway 32. Line section 42 may be easily grasped by inserting finger and thumb through access holes 46 and 48 to cause line section 42 to depart passageway 32 and define space 44. In the preferred embodiment, access holes 46 and 48 are oblong shaped. However, the invention is not limited to this embodiment and contemplates circular, eliptical, square, triangular, rectangular or any other regularly or irregularly shaped access holes.

Elongated body 12 also has attachment holes 50 through median strip 51 between passageways 20 and 32. Attachment holes 50 extend entirely through elongated body 12 perpendicular to the plane containing passageways 20 and 32. The boat pole 70 can be secured to the attachment device 72 that is fastened to elongated body 12. Alternatively, a string 54 running through attachment hole 50 will fit over a boat hook. Or a string 54 extending through attachment hole 50 might extend along line 14 away from elongated body 12 to allow a person to pull the elongated body 12 away from the post 56 to loosen eye 58 from a distance beyond the physical reach of the user's arm. In this manner, the eye 58 in the line may be slipped over objects beyond the reach of the user's arm by using the boat hook attached at one end to attachment hole 50. The eye 58 in line 14 is tightened around post 56 by applying tension to line 14. The line 14 is detached from post 56 by pulling string 54 to loosen eye 58 in line 14 and slipping the eye 58 over post 56 using a boat hook attached to attachment hole 50 or, alternatively, string 54.

The invention is not limited to attachment means and extension means of a hole or string and boat hook. The invention further contemplates any means for extending the reach of a user of the device including extension poles, fishing rods, or any other suitable means. The invention also contemplates any means for attaching one end of the extension means to elongated body 12 including ring 74 and hook or clasp, snaps or any other suitable means.

An eye 58 can be formed in line 14 by passing line 14 through and around elongated body 12. In the preferred embodiment, line 14 is introduced into elongated body 12 through opening 26 at longitudinal end 22. The line 14 passes through passageway 20 and out of the elongated body 12 through lateral opening 16. The line 14 then passes over lateral portion 60, exposing section 68 of line 14, and back into passageway 20 through lateral opening 18. Line 14 then exits passageway 20 through opening 28 at longitudinal end 24. After forming eye 58, line 14 passes back into elongated body 12 through opening 36 to passageway 32. Line 14 then passes through passageway 32 and exits out opening 34 at longitudinal end 22. Line section 42 of line 14 can be made to depart passageway 32 by grasping line section 42 through access holes 46 and 48. A space 44 is defined between line section 42 and elongated body 12 where the line section 42 has been forced to depart passageway 32. Line 14 then forms loop 62 before passing through space 44 between line section 42 and elongated body 12. Line 14 then passes over elongated body 12 forming bend 64 and then passes between loop 62 and elongated body 12.

When line 14 is pulled tight at end 66, the line tightens and is secured to elongated body 12. The length of eye 58 is adjusted by sliding line 14 through passageway 20; in the direction from longitudinal end 22 to longitudinal end 24 to lengthen the eye and in the reverse direction to shorten or tighten eye 58. Once eye 58 is secured and tightened around post 56, further tension causes bend 64 to further tighten around elongated body 12 and section 68 of line 14. This tightening causes increased friction on line 14 and restricts line 14 from passing in either direction through passageway 20. Eye 58 may subsequently be lengthened by pulling elongated body 12 away from post 56 overcoming friction forces applied by bend 64 of line 14 against section 68 of line 14 to allow line 14 to pass through passageway 20. Eye 58 may be subsequently shortened by pulling line 14 away from elongated body 12 to overcome the same friction forces.

The invention is not limited to passing line 14 through and around elongated body 12 in the manner of this embodiment but includes any possible path of line 14 through and around elongated body 12 which produced an eye in line 14.

While the invention has been described with reference to a specific embodiment, the exact nature and scope of the invention is defined in the following claims.

I claim:

1. A line fastening device for forming an eye in a line, comprising:

an elongated body having first and second longitudinal ends with first and second passageways extending through the body between the ends and openings at the ends for passing line through each passageway, wherein the elongated body has a first lateral opening in the body extending into the first passageway allowing line within the passageway to depart the passageway, and two adjacent second and third lateral openings in the body extending into the second passageway for passing a line out of the second passageway through the second lateral opening and back into the second passageway through the third lateral opening, a body portion between the second and third lateral openings holding a line passing thereover out of the second passageway.

2. The device of claim 1 wherein the elongated body has a first access hole into the first passageway perpendicular to the first opening and communicating with the first opening.

3. The device of claim 2, wherein the elongated body has a second access hole into the first passageway, opposite the first hole perpendicular to the first opening and communicating with the first opening.

4. A line fastening device for forming an eye in a line, as described in claim 1 wherein said passageways are parallel.

5. The device of claim 1 wherein the second and third lateral openings are located on a lateral side opposite the first lateral opening.

6. The device of claim 1, further comprising a line passing into the second passageway at the first longitudinal end, out of the elongated body through the second lateral opening, crossing the body portion, passing back into the second passageway of the elongated body through the third lateral opening, out of the second passageway through the second longitudinal end, forming an eye, the line passing into the first passageway through the second longitudinal end and passing out of the first passageway through the first end.

7. The device of claims 1, 2, or 3 further comprising a line passing into the second passageway at the first longitudinal end, passing out of the second passageway at the second end, forming an eye, passing into the first passageway at the second end, and passing out at the first passageway at the first longitudinal end while allowing a section of line to depart from the first lateral opening.

8. The device of claim 7, wherein the line forms a loop before passing between the elongated body and the section of line departing from the elongated body at the first lateral opening, passing over the elongated body and between the elongated body and the loop.

9. The device of claim 1, further comprising a line passing into the second passageway at first longitudinal end, passing out of the second passageway through the second lateral opening, passing back into the second passageway through the third lateral opening, passing out of the second passageway at second longitudinal end, forming an eye, passing into the first passageway at the second longitudinal end, passing out of the first passageway of first longitudinal end allowing a section of line to depart from the first passageway through the first lateral opening.

10. The device of claim 9, wherein the line forms a loop before passing between the elongated body and the section of line departing from the first passageway, passes over the elongated body and passes between the elongated body and the loop.

11. The device of claims 1 or 9, further comprising extension means for manipulating the elongated body across distances.

12. The device of claim 11, wherein the extension means comprises a boat hook and attachment means for attaching one end of the boat hook to the elongated body.

13. The device of claim 12, wherein attachment provides for the boat hook to be fastened to elongated body.

14. The device of claim 12, wherein attachment means comprises a string passing through an attachment hole through the elongated body not interfering with the passageways for attachment to one end of the boat hook.

15. The device of claim 12, wherein attachment means comprises a ring connected to the elongated body for reversibly receiving one end of the boat hook.

16. The device of claim 11, wherein the elongated body has an attachment hole through it not interfering with the passageways and extension means comprises a string passing through the attachment hole along the line away from the elongated body for remote manipulation.

* * * * *